(No Model.) 6 Sheets—Sheet 2.

J. HODGKINSON.
MECHANICAL STOKER.

No. 467,008. Patented Jan. 12, 1892.

Witnesses.
Robert Everett.
J. A. Rutherford.

Inventor.
James Hodgkinson.
By James L. Norris.
Atty.

(No Model.) 6 Sheets—Sheet 3.
J. HODGKINSON.
MECHANICAL STOKER.
No. 467,008. Patented Jan. 12, 1892.
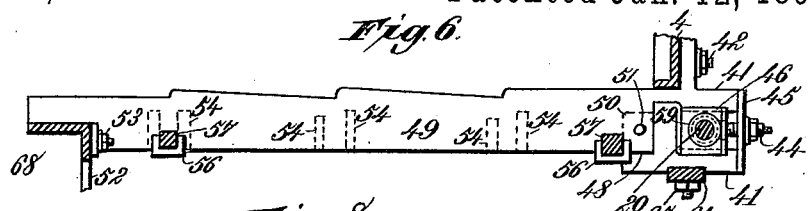
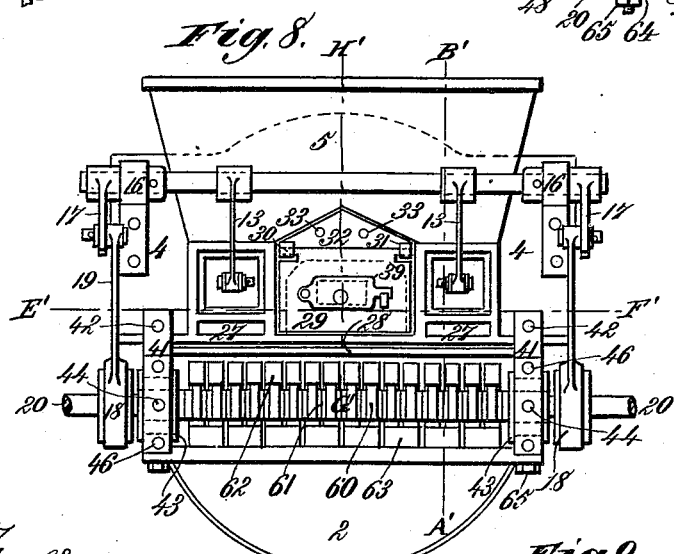
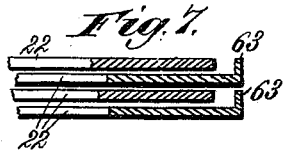
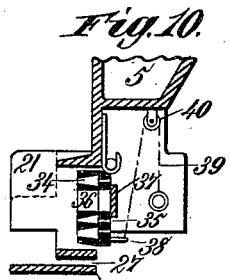
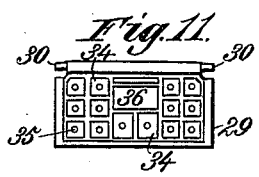
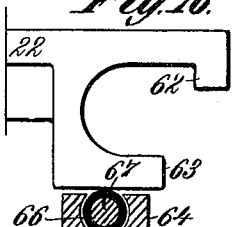
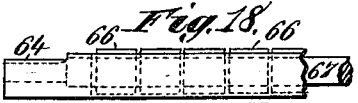
Witnesses,
Robert Everett,
J. A. Rutherford.
Inventor.
James Hodgkinson,
By James L. Norris,
Atty.

(No Model.)　　　　　　J. HODGKINSON.　　　　6 Sheets—Sheet 4.
MECHANICAL STOKER.
No. 467,008.　　　　　　　　　Patented Jan. 12, 1892.
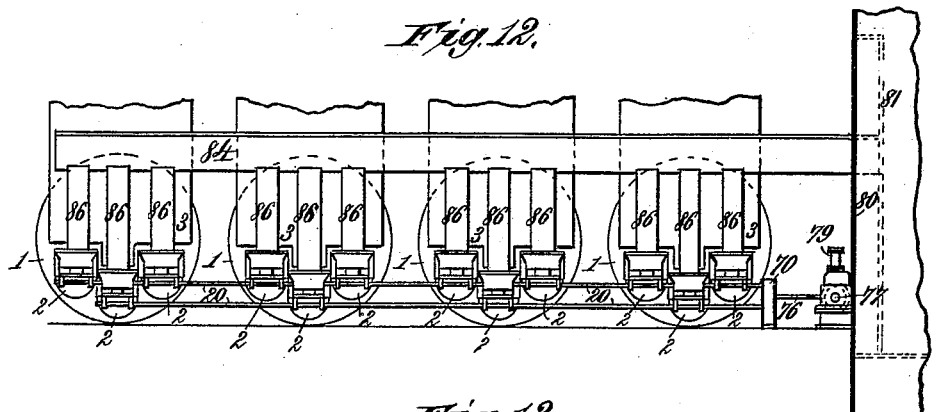
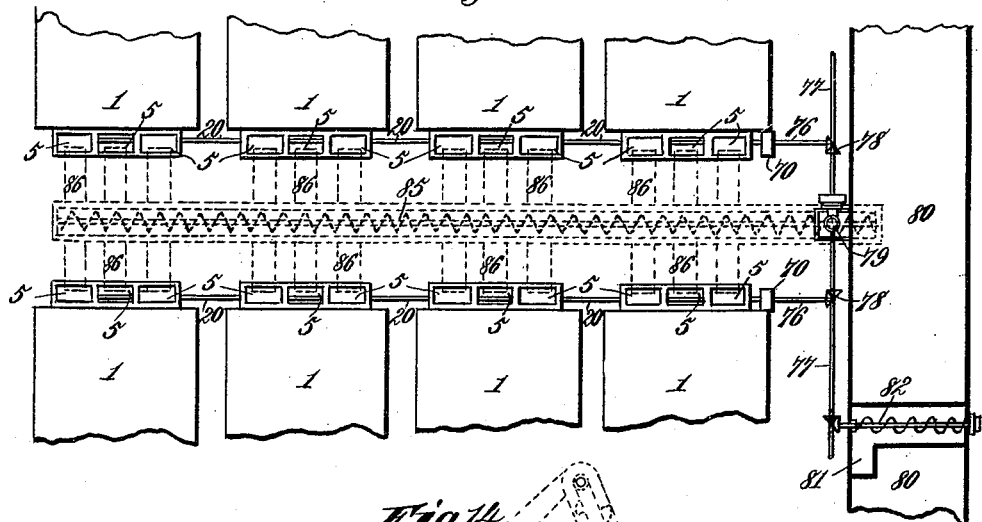
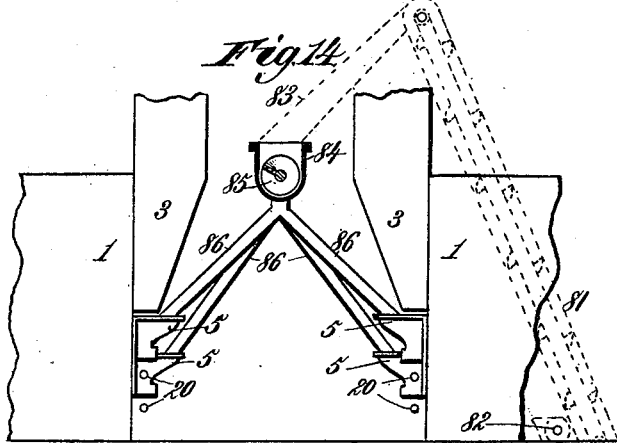
Witnesses.　　　　　　　　　　　　Inventor:
　　　　　　　　　　　　　　　　James Hodgkinson.
　　　　　　　　　　　　　　　By James L. Norris.
　　　　　　　　　　　　　　　　　Atty.

(No Model.) 6 Sheets—Sheet 5.
J. HODGKINSON.
MECHANICAL STOKER.
No. 467,008. Patented Jan. 12, 1892.
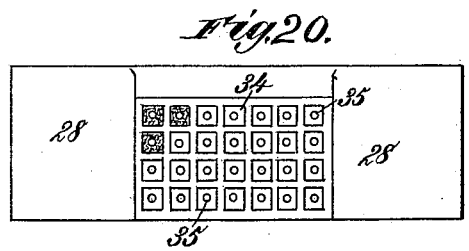
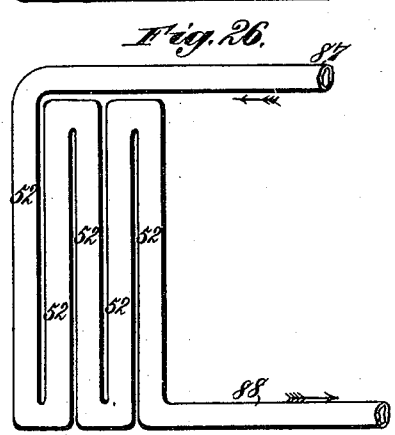
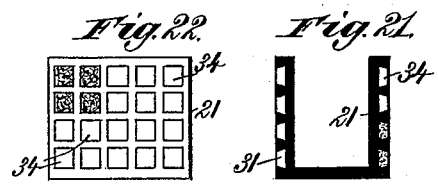
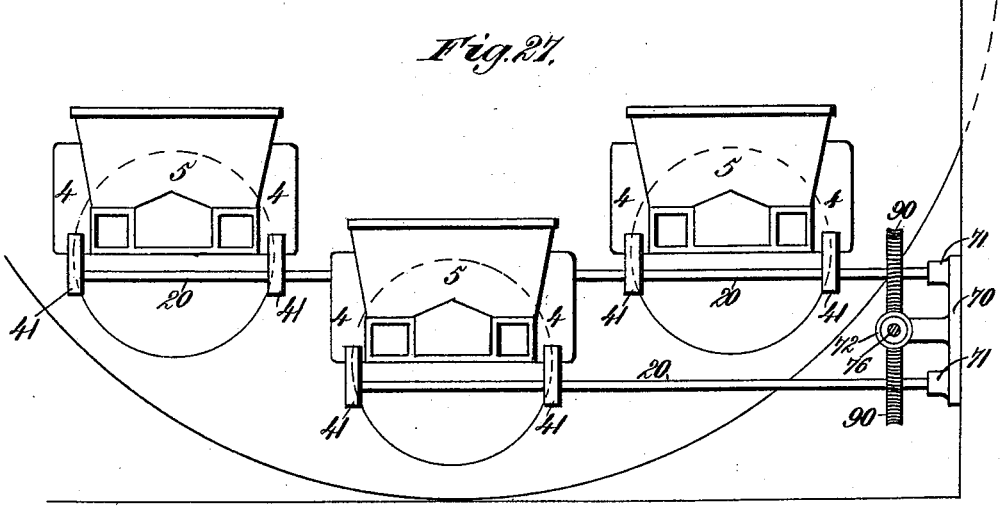
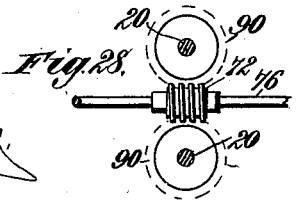
Witnesses
Robert Emmett
J. A. Rutherford
Inventor:
James Hodgkinson,
By James L. Norris.
Atty.

(No Model.) 6 Sheets—Sheet 6.

J. HODGKINSON.
MECHANICAL STOKER.

No. 467,008. Patented Jan. 12, 1892.

Witnesses.
Robert Emmett
J. A. Rutherford

Inventor:
James Hodgkinson.
By James L. Norris
Atty.

UNITED STATES PATENT OFFICE.

JAMES HODGKINSON, OF MANCHESTER, ENGLAND.

MECHANICAL STOKER.

SPECIFICATION forming part of Letters Patent No. 467,008, dated January 12, 1892.

Application filed March 30, 1891. Serial No. 387,015. (No model.) Patented in England September 23, 1889, No. 14,958.

*To all whom it may concern:*

Be it known that I, JAMES HODGKINSON, engineer, of Woden Street, Ordsal Lane, Manchester, in the county of Lancaster, England, have invented new and useful Improvements in Mechanical Stokers, (for which I have obtained a patent in Great Britain, No. 14,958, dated September 23, 1889,) of which the following is a specification.

This invention relates to mechanical stokers; and it consists in the features of construction and the combination or arrangement of parts hereinafter described and claimed, reference being made to the accompanying drawings, in which—

Figure 1:
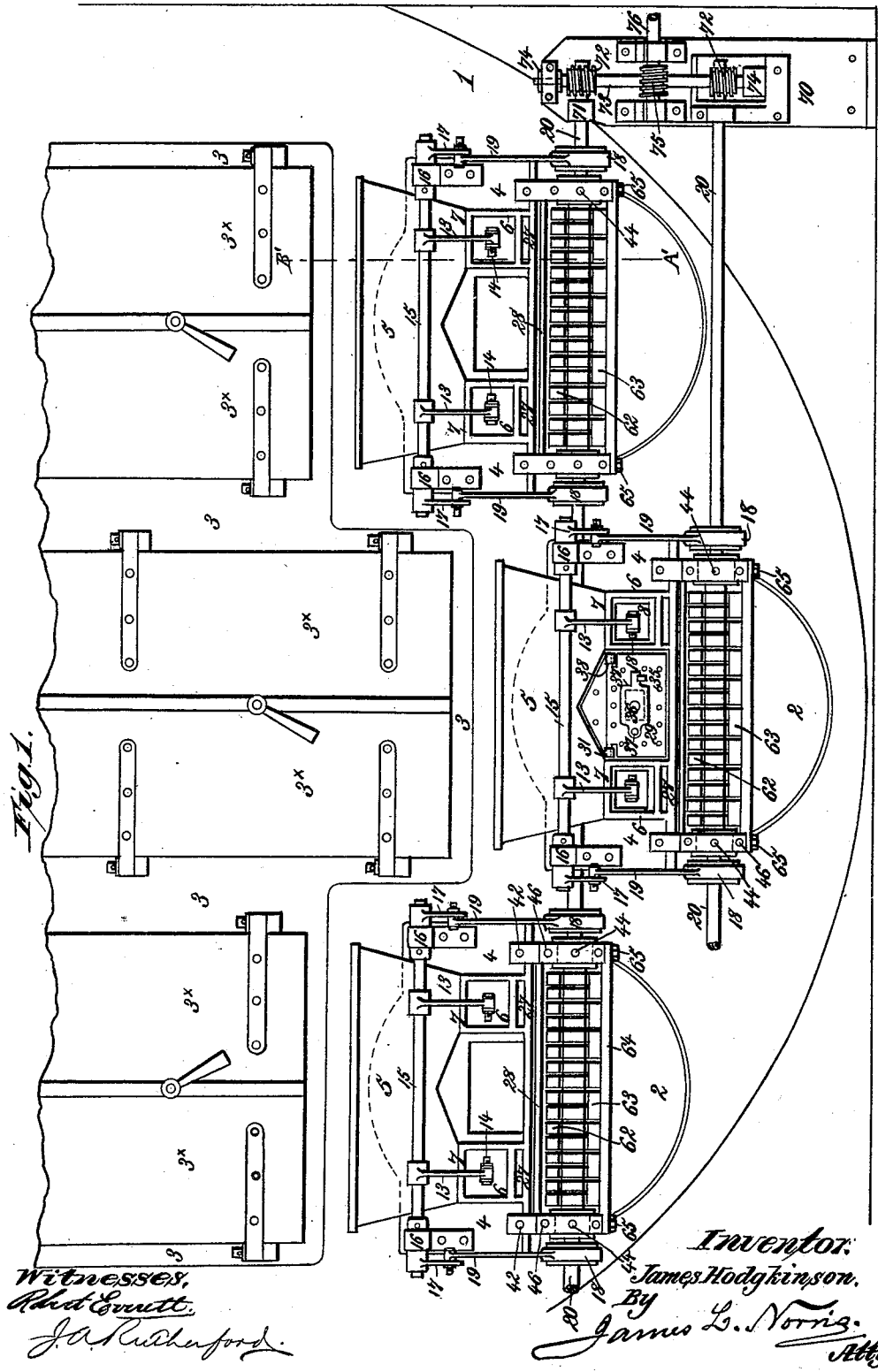
Figure 2:
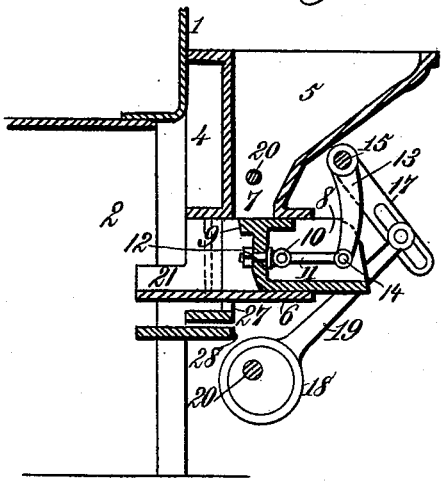
Figure 3:
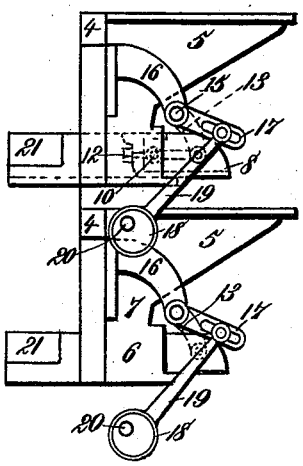
Figure 4:
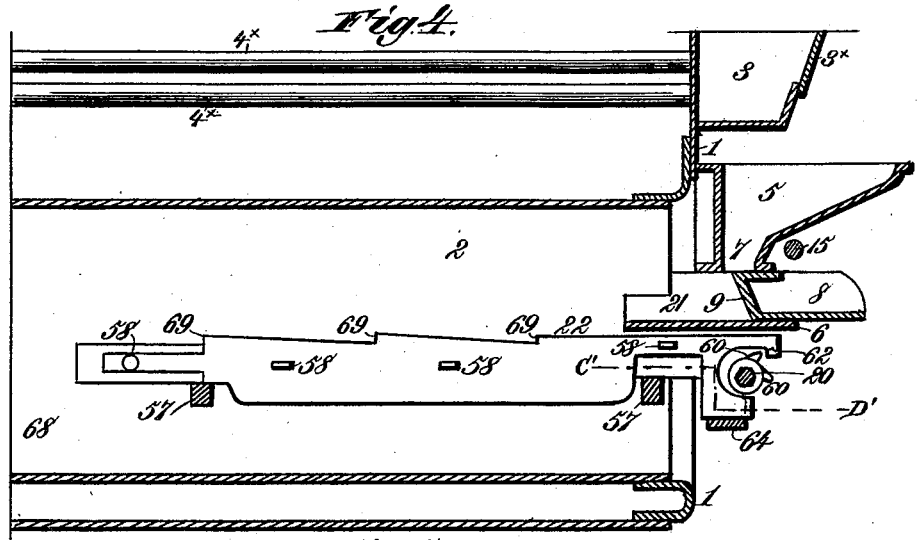
Figure 5:
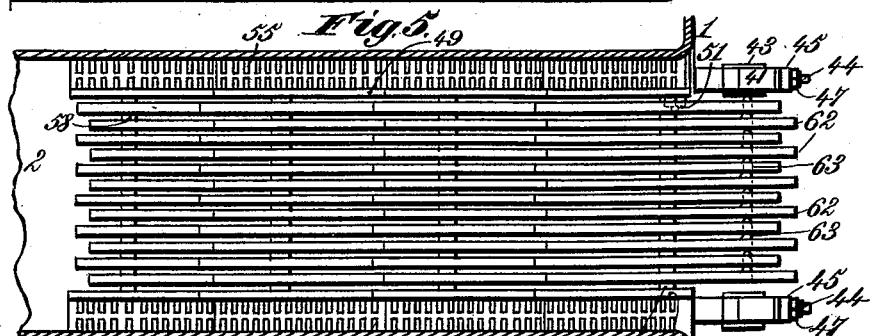
Figure 23:
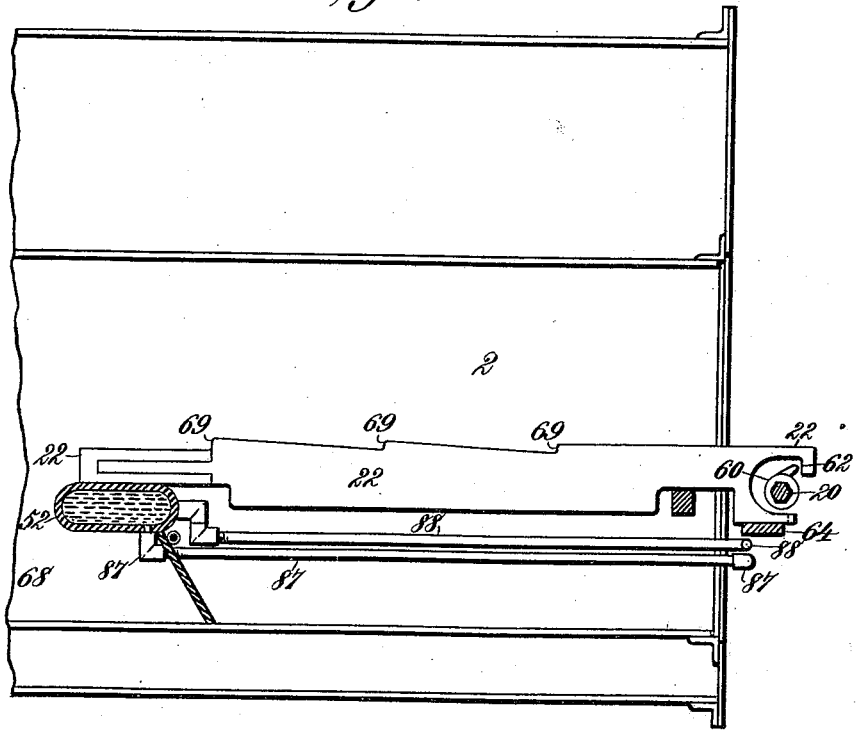
Figure 24:
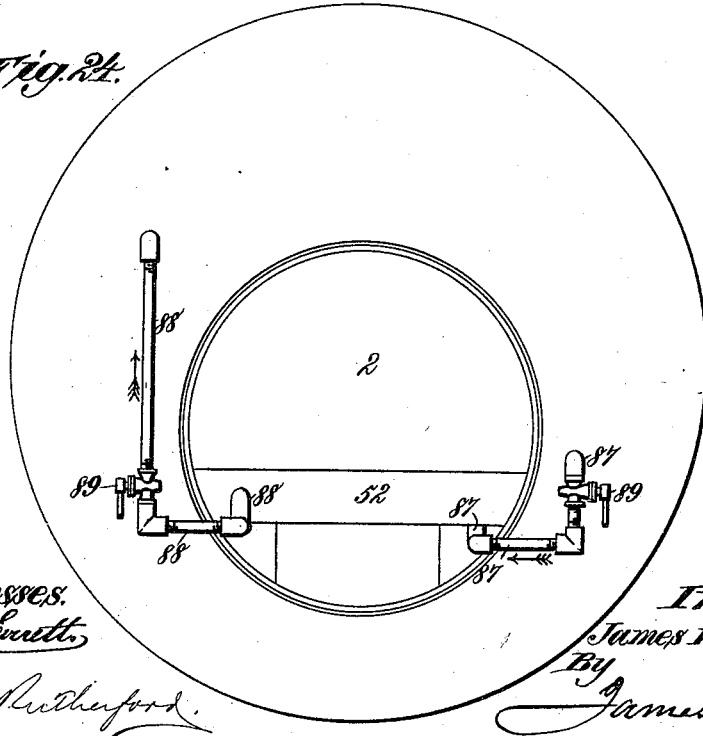

Figure 1 is a front elevation of my improved mechanical stoker on the ram and coking principle as applied to marine boilers with flues or furnaces of varying heights or centers. Fig. 2 is a sectional elevation through lines A' B' in Figs. 1 and 8. Fig. 3 is a side elevation of my improved stoker as applied to marine boilers with flues or furnaces of varying heights or centers. Fig. 4 is a sectional longitudinal elevation of my improved mechanical stoker on the ram and coking principle and self-cleaning fire-bars with their supports and means for operating the same. Fig. 5 is a plan of fire-bars with stoker removed. Fig. 6 is a longitudinal side elevation of side bars and supports for carrying the movable or self-cleaning fire-bars. Fig. 7 is a sectional plan through line C' D' in Fig. 4. Fig. 8 is a front elevation of my improved mechanical stoker on the ram and coking principle as applied to marine, Lancashire, Cornish, and other boilers or furnaces. Fig. 9 is a section through line E' F' in Fig. 8 with the rams removed. Fig. 10 is a sectional elevation through line G' H' in Fig. 8. Fig. 11 is a back elevation of firedoor, showing divisions to hold non-conducting material. Fig. 12 is an elevation of a range of marine boilers fitted with my improved mechanical stoker, with means for automatically supplying the same with fuel and for driving the same. Fig. 13 is a plan of same. Fig. 14 is a side elevation of Fig. 13, showing the elevator for supplying fuel from the coal-bunkers to the hoppers of mechanical stokers. Fig. 15 is a side elevation of jaw end of movable bars when being moved backward by the advance cams. Fig. 16 is a modification of the bearing-bar 64, provided with a shaft or center carrying ferrules to minimize friction when the bars are sliding thereon. Fig. 17 is an end view showing bearing for the shaft or center. Fig. 18 is a part front view of Figs. 16 and 17. Fig. 19 is a sectional elevation of dead-plate constructed with pockets to receive refractory material or materials to prevent the burning of the same and prolong its life. Fig. 20 is a plan of same. Fig. 21 is a sectional elevation of coking-boxes provided with pockets to receive refractory material or materials. Fig. 22 is an outside longitudinal view of Fig. 21. Fig. 23 is a part sectional elevation of a boiler and flue, showing my improved back-bearer or dead-plate. Fig. 24 is a front view of boiler and pipe connections to back-bearer or dead-plate. Fig. 25 is a sectional elevation of a modification of back-bearer or dead-plate composed of pipes. Fig. 26 is a plan of same. Fig. 27 is a part front elevation of a marine boiler with flues of varying heights fitted with my improved coking-stoker and bars, and Fig. 28 is a side elevation of driving-gear for same.

In all the figures the same numerals are employed to indicate corresponding parts.

1 is the front view of a marine boiler; 2, the flues or furnaces; 3, the smoke-boxes; $3^\times$, the smoke-box doors; 4, the frame-work of the stoker, to which are cast the fuel-hopper 5 and the ram guides or casings 6. The hopper 5 of each marine stoker is fixed below the smoke-box 3, as shown in Figs. 1 and 4, for the purpose of allowing the smoke-box doors $3^\times$ being opened to clean the tubes $4^\times$ or other purposes without removing the hoppers 5 or interfering with the same, thus overcoming one of the most serious difficulties hitherto met with in applying mechanical stokers to marine boilers. Fuel passes from the hopper 5 down the chutes 7, leading to each side of the flue or furnace, from whence it is pushed by the moving rams 8 to the coking-boxes 21. The rams 8 are provided with the inclined pushing-surfaces 9 to prevent fuel being lifted or forced back into the chutes 7, leading to the hopper 5, when making a forward stroke. The upper edge of the ram 8 is formed with a feather-edge to facilitate the breaking of fuel and to minimize friction when making a forward stroke.

To the rams 8 are secured the centers 10 and links 11 by the nuts 12. The outer ends of the links 11 are attached to the levers 13 by the centers 14. The levers 13 are fixed to the shaft 15, mounted in the bearings 16 on the frame-work or ram-box sides of the stoker. The shaft 15 is fitted with slotted levers 17, operated by the eccentrics 18 and rods 19 from the bar-shaft 20. The levers 17 are provided with slots to allow of the stroke of the rams 8 being altered at will to supply fuel in desired or adjustable quantities. As the rams 8 are moved outwardly the fuel drops from the chutes 7 into the ram guides or casings 6, from whence it is pushed by each forward movement or stroke of the rams 8 into the coking-boxes 21. By the intermittent action of the rams 8 in supplying fuel to the coking-boxes 21 the coked fuel is pushed onto the fire-bars 22. Owing to the action of the coking-boxes, in combination with the sides of the flue, some of the fuel as it cokes and swells up falls over the inner edges of the coking-boxes toward the center line of the furnace, so as to feed the area along the central fire-bars.

The external sides of the coking-boxes 21 are formed, as shown in Figs. 2, 3, 4, 9, 21, and 22, to allow of the coked fuel passing to the sides of the flues or furnaces to insure even distribution. The coking-boxes 21 are provided with the taper pockets or spaces 34, which are filled with fire-clay, asbestus, or other refractory materials or compounds to prevent the burning away of the same. The pockets or spaces 34 are made taper, as shown, to hold the refractory materials in place.

The coking-boxes 21 are provided on one side or edge with the lip 23, fitting into the recess or chamber 24 on the back side of the frame-work 4 of the stoker, the other side being fitted with the lug or snug 25 to allow of its being secured to the frame-work 4 by the bolt 26, as shown in Fig. 9. This arrangement allows of the coking-boxes 21 being easily applied and removed, but prevents their displacement with ordinary working.

Under the coking-boxes 21 it is convenient to provide the passages 27 to admit atmospheric air to aid combustion.

Below the frame-work 4 of the stoker is fixed the dead-plate 28, which may have an air-space between its upper side and the under side of the frame-work 4 to admit atmospheric air to aid combustion. The dead-plate 28 is provided with the taper pockets or spaces 34, which are filled with fire-clay, asbestus, or other refractory materials or compounds to prevent the burning away of the same. The pockets or spaces 34 are made taper, as shown in Fig. 19, to hold the refractory materials in place.

Holes 35 may be provided in the dead-plate 28 to admit of atmospheric air passing through to aid combustion. The rams 8, guides or casings 6, and the coking-boxes 21 are disposed sufficiently apart to leave a space between them to allow of the fire-door 29 being sufficiently large to admit of hand-firing being resorted to at any moment in case of accident to the mechanical stoker or otherwise, as desired. The fire-door 29 is provided with the centers 30, supported in the bearings 31 on the plate 32, secured to the frame-work 4 by the bolts 33. The heat at the front of the furnace is so great as to rapidly burn away the ordinary fire-door. To provide against this, I form the door in the shape of a grid, the spaces 34 in which are filled with fire-clay, asbestus, or other refractory materials or compounds. The spaces 34 are made taper, as shown, so as to hold the refractory materials in place. Holes 35 may be provided to admit of atmospheric air passing through to aid combustion. The fire-door 29 is fitted with the opening 36, over which fits the pivoted door 37 to allow of the condition of the fire being ascertained without opening the fire-door 29, thus avoiding the ill effects arising from the opening of the latter. The fire-door 29 is fitted with the hook 38 and chain 39, the latter passing over the pulley 40 to open the same when desired.

It will be seen on examining Figs. 1 and 27 that, owing to the varying heights of the flues or furnaces in marine boilers, the bar-shaft 20 passes through the fuel-hopper 5 of the stoker attached to the bottom flue or furnace.

In carrying out my improvements in self-cleaning fire-bars for coking-stokers the heads 41 are secured to the frame-work 4 of the stoker by the bolts 42. In the heads 41 are disposed the adjustable sliding blocks 43, carrying the bar-shaft 20. The sliding blocks 43 are fitted with the adjusting-screws 44, passing through the threaded plates 45, secured to the jaw ends 46 of the heads 41 by the bolts or set-screws 46. After the sliding blocks 43 have been set by the adjusting-screws 44 they are locked in position by the nuts 47 mounted thereon. The back side of each head 41 is provided with the ledge or support 48, in which the front end of the side bars 49 rest, being secured in position vertically to the side flange 50 on the head 41 by the bolts 51. The back end of each side bar 49 is fitted or secured to the bridge-plate 52 by the bolts 53, as shown in Fig. 6. The side bars 49 are furnished on the sides next to the casing forming the flue or furnace with the distance-pieces or supports 54, on which are placed air-grids 55, as shown in Fig. 5. The inner side of each side bar 49 is provided with the pockets 56, carrying the bars or bearers 57 to support the movable fire-bars 22. To the latter are cast the distance-pieces 58 to determine sufficient air-space between the bars. If desired, the back-bearer or dead-plate 52 can be made hollow to contain water to prevent its burning away, being fitted to the boiler-flue 2 in any convenient manner. In constructing the back-bearer or dead-plate in this manner it is designed to carry the back end of the fire-bars 22, as shown in Fig. 23. The hollow back-bearer or dead-plate 52 is charged with water to prevent the same burning away, as hitherto. Water is conveyed from the boiler-front to the back-bearer or dead-plate 52 by the pipes 87 and from the same by the pipes 88 back to the boiler, as indicated by the arrows in Fig. 24, by which a perfect circulation will be maintained without destroying or weakening the boiler-flue 2 by drilling, as heretofore, thus avoiding the evil results of expansion and contraction experienced in circulating water bridges or bearers. The pipes 87 and 88 are fitted with the valves or taps 89 to regulate the water-supply to the back-bearer or dead-plate 52. If desired, the hollow back-bearer or dead-plate can be composed of the pipes 52, placed side by side and jointed together at the ends, as shown in Figs. 25 and 26, being coupled to the pipes 87 and 88, through which water circulates, as indicated by the arrows. The shaft 20 for operating the movable fire-bars 22 can be of any convenient section, the ends being provided with the bushes 59, mounted in the sliding blocks 43 in the heads 41. The shaft 20 is fitted with the loosely-mounted cams or tappets 60 and distance-washers 61 between each cam or tappet. The cams or tappets 60 are disposed on the bar-shaft 20 so as to operate on the lips 62 on the outer ends of the movable bars 22 in such a manner as to move them out singly, alternately, or in sets from back to front of the furnace. In the case of moving the bars 22 out singly or alternately one half of the cams or tappets 60 are set in advance of the other half, as shown in Figs. 4 and 15. Immediately the cams or tappets 60 have moved the first half or other portions of the fire-bars 22 outwardly their full travel the remaining cams or tappets 60 bring or force out the remainder. Each alternate bar 22 is provided on the lower end of the jaw with the lip 63, which extends or projects over the front end of the next bar, as shown in Figs. 1, 7, and 8. The movable fire-bars 22, with the lips 63, are moved outwardly in advance of those without the said lips by the cams or tappets 60. When the movable bars without the lips 63 have been moved outwardly, the front end of the lower part of the jaw is in contact with, or nearly so, the back side of the lips 63. Immediately all the bars 22 have been moved or drawn out to their full extent and the last set of cams or tappets 60 are clear of the lips 62 the advance cams or tappets 60 operate on the front side of the lips 63, as shown in Fig. 15, by which all the bars 22 are moved back together to carry the fire on to make room for a fresh supply of fire or fuel from the coking-boxes 21, and so on continuously as long as the mechanical stoker is in motion. To maintain the correct working position and prevent canting of the movable fire-bars 22 under all conditions, the bar or support 64 is provided and placed under the jaw ends of the said bars, being secured to the under side of the heads 41 by the bolts or set-screws 65, as shown in Figs. 1, 6, 8, and 23. If it is desired to reduce or minimize the friction between the under side of the jaw ends of the bars 22 and the bar end or support 64, the latter is fitted with the ferrules 66, mounted on the center 67, as shown in Figs. 16 and 18. The upper surface of each fire-bar 22 is made with stepped or irregular surfaces, as shown in Figs. 4 and 23, by which the fuel or fire lying thereon is rammed or pushed on toward the back end of the bars to the combustion and clinker chamber 68 by the raised edges or projections 69. These projections, with the upper surface of the bar, are shaped, as shown, so that the effect on the fuel of the inward motion of each bar is as great as possible, while the effect of the outward movement is as small as possible. The bar shaft or shafts 20 extend to the fixing 70 and are supported in the bearings 71, as shown in Figs. 1, 12, 13, and 27. The outer end of each bar-shaft 20 is provided with a worm-wheel driven by the worms 72 on the shaft 73, supported in the bearings 74 on the fixing 70. On the shaft 73 is fixed a worm-wheel driven by the worm 75 on the shaft 76, which is connected to the engine-shaft or other driving medium in any convenient manner, according to the speed at which it is desired or necessary to rotate the same. The driving-shafts 20 can be provided with the worm-wheels 90, both of which are driven by the intervening worm 72, mounted on the shaft 76, coupled direct to the engine or other motor. The shafts 20 and 76 are supported in the bearings 71 on the fixings 70, secured to the bunker side or other place.

In applying my improved stokers and fire-bars to marine boilers with flues or furnaces at varying heights I drive a whole range from the shaft 76, as shown in Figs. 12 and 13. In these figures it will be seen that the shaft 76 is driven direct from the engine-shaft 77 by the bevel or other wheels 78. In this arrangement the marine boilers are disposed opposite each other, both sides being driven alike. In case of other rows of boilers, as is often the case in large sea-going steamers, the engine-shaft 77 is extended, as shown in Fig. 13, from whence it can be driven by bevel or other wheels 78 or gearing, as desired. The shaft 77 is driven by the engine 79, firmly secured to the bunker 80, or otherwise.

On examination of Figs. 12, 13, and 14 it will be seen that I can automatically feed the hopper 5 of each mechanical stoker with fuel direct from the coal-bunker. This I effect by means of the ordinary bucket-elevator 81, fed by the creeper 82, the latter being driven from the engine-shaft 77 by wheel or other gear. As the elevator 81 rotates or traverses, the fuel is tipped down the chute 83 into the trough 84, from whence it is carried by the screw or creeper 85 to the chutes 86, leading to the hoppers 5 of the stokers. In case the coal-bunkers are disposed at a point above the hoppers 5 of the stokers the fuel is fed by gravity into the trough 84, containing the screw or creeper 85, and on to the chutes leading to the said hoppers. Suitable mechanical appliances can be fitted to the chutes 86 for regulating the supply of fuel to the hoppers.

I claim—

1. In a furnace with movable fire-bars, the combination of a fire-door that will allow of hand-firing, a horizontal ram and coking-box on each side thereof and on a level with the fire-door, a hopper, and mechanism for driving the stoker, substantially as described, and so located as to permit of the opening of the smoke-box door when applied to marine or other boilers with smoke-boxes without moving the hopper or other parts.

2. In a furnace with movable fire-bars, the combination of a fire-door that will allow of hand-firing, a horizontal ram and coking-box on each side of said fire-door and on a level with same, each of said rams having a feather-edge on the upper side of inclined pushing-surface to cut fuel, fuel-feeding hoppers leading directly to said coking-boxes, and mechanism for driving the stoker, substantially as described.

3. In a mechanical stoker, the combination of a frame-work having a recess 24, a coking-box having on one side a lip 23, fitting said recess, and on its other side a lug 25, secured to the said frame-work, a feed-hopper leading directly to said coking-box, rams working in said coking-boxes, and means for operating said rams, substantially as described.

4. In a mechanical stoker, the combination of the feed-hoppers, the coking-boxes beneath the same, rams working in said coking-boxes, means for operating said rams, and a dead-plate beneath each of said coking-boxes to form a space for the admission of atmospheric air to aid combustion, substantially as described.

5. In a mechanical stoker, the combination, with feed-hoppers and coking-boxes beneath the same, of rams working in said coking-boxes, a shaft 15, links 11 and 13, connecting said rams to said shaft 15, slotted levers 17, and a shaft 20, carrying eccentrics 18, having rods 19, connecting with said slotted levers 17, substantially as and for the purpose described.

6. In furnaces of marine boilers arranged side by side and facing each other and fitted with mechanical stokers, consisting of coking-boxes, a fire-door that will allow of hand-firing, horizontal rams in each coking-box and on a level with said fire-door, each horizontal ram having an upper feather-edge, an inclined pushing-surface to cut or break fuel when feeding, fuel-feeding hoppers leading directly to said coking-boxes, and mechanism for driving the stoker and movable bars, the combination of the chutes 86, creeper-box 84, creeper 85, elevator 81, creeper 82, and chute 83 for the purpose of conveying fuel mechanically from the coal or fuel bunkers of a steamship or vessel to the hoppers 5 without the aid of manual labor, substantially as described.

7. In a furnace with movable fire-bars therein, the combination of the hollow back-bearer fixed independently of the boiler-flue, pipes conveying water to and from the same from the boiler-front, and valves for regulating circulation and flow of water through the same, the whole being mounted to prevent the destruction of the boiler-flue by expansion and contraction, substantially as described.

In testimony whereof I have hereunto set my hand and affixed my seal in presence of two subscribing witnesses.

JAMES HODGKINSON. [L. S.]

Witnesses:
R. BLAIR ROBERTSON,
EDMUND CHADWICK.